Dec. 3, 1940.　　　J. W. WUNSCH　　　2,223,863
LOAD HANDLING MECHANISM
Filed Jan. 23, 1939　　　8 Sheets-Sheet 1

INVENTOR
Joseph W. Wunsch
BY
Donald U. Rich
ATTORNEY

Dec. 3, 1940.   J. W. WUNSCH   2,223,863
LOAD HANDLING MECHANISM
Filed Jan. 28, 1939   8 Sheets-Sheet 2

Fig. 2.

INVENTOR
Joseph W. Wunsch
BY
ATTORNEY

Dec. 3, 1940.  J. W. WUNSCH  2,223,863
LOAD HANDLING MECHANISM
Filed Jan. 28, 1939  8 Sheets-Sheet 4

INVENTOR
Joseph W. Wunsch
BY
ATTORNEY

Patented Dec. 3, 1940

2,223,863

UNITED STATES PATENT OFFICE 2,223,863

LOAD HANDLING MECHANISM

Joseph W. Wunsch, Brooklyn, N. Y.

Application January 28, 1939, Serial No. 253,405

11 Claims. (Cl. 212—38)

This invention relates to load handling mechanism in general and in particular to such mechanism when mounted on wheels and readily movable together with the load.

In the past equipment for handling material by means of a transporting vehicle equipped with hoist means have been provided but such equipment has been in the main objectionable due to the tendency when loaded for the drive wheels to become light, thus decreasing traction. It is an object, therefore, of the present invention to provide a power driven vehicle having the front wheels thereof driven and carrying thereabove a hoist or other lifting device.

A further object of the invention is the provision of a power driven hoist or load lifting vehicle having the front wheels driven and the rear wheels controlled by steering apparatus.

A still further object of the invention is the provision of a power driven vehicle equipped with hoist or other lifting means and with power take-off and control devices whereby the hoist device may be completely power controlled at all times.

A yet further object of the invention is the provision of a power driven vehicle having hoist or other lifting device carried thereby and power controlled together with safety devices to prevent dangerous movements of the hoist device.

These and other objects of the invention will be apparent to persons skilled in the art from a study of the following description and accompanying drawings, in which.

Referring now more particularly to the drawings, in which similar characters of reference indicate similar parts in the several views, it can be seen that the hoist and control equipment has been applied to a vehicle having a frame comprising longitudinally extending side frame members 1 which, in the instance shown, are channel shaped in cross section. The beams 1 are connected together by suitable transverse members, hereinafter described, to form a rigid frame. Stationary axles 2 are provided at the forward end of the frame which are supported by rotatable driving wheels 3 having driving sprockets 4. The rear end portion of the frame is supported by steering wheels 6 mounted respectively on opposite end portions of an axle 7 (see Figure 7). As shown clearly in Fig. 7 the steering wheels 6 are close coupled and the axle 7 has connected thereto the lower portion 7' of a king pin K, the upper portion 8' of which is connected with the lower portion 7' by a pin 9' and a bolt 10'. As clearly shown in Fig. 7, the upper portion of king pin element 7' is formed substantially as a socket into which the lower end of the upper portion 8' of king pin K extends, and also as clearly shown in Fig. 7 the lower end of portion 8' of king pin K is convexed as shown at 11' whereby to permit movement of wheels 6 and portion 7' of king pin K in accordance with irregularities in the road surface.

Figure 1:
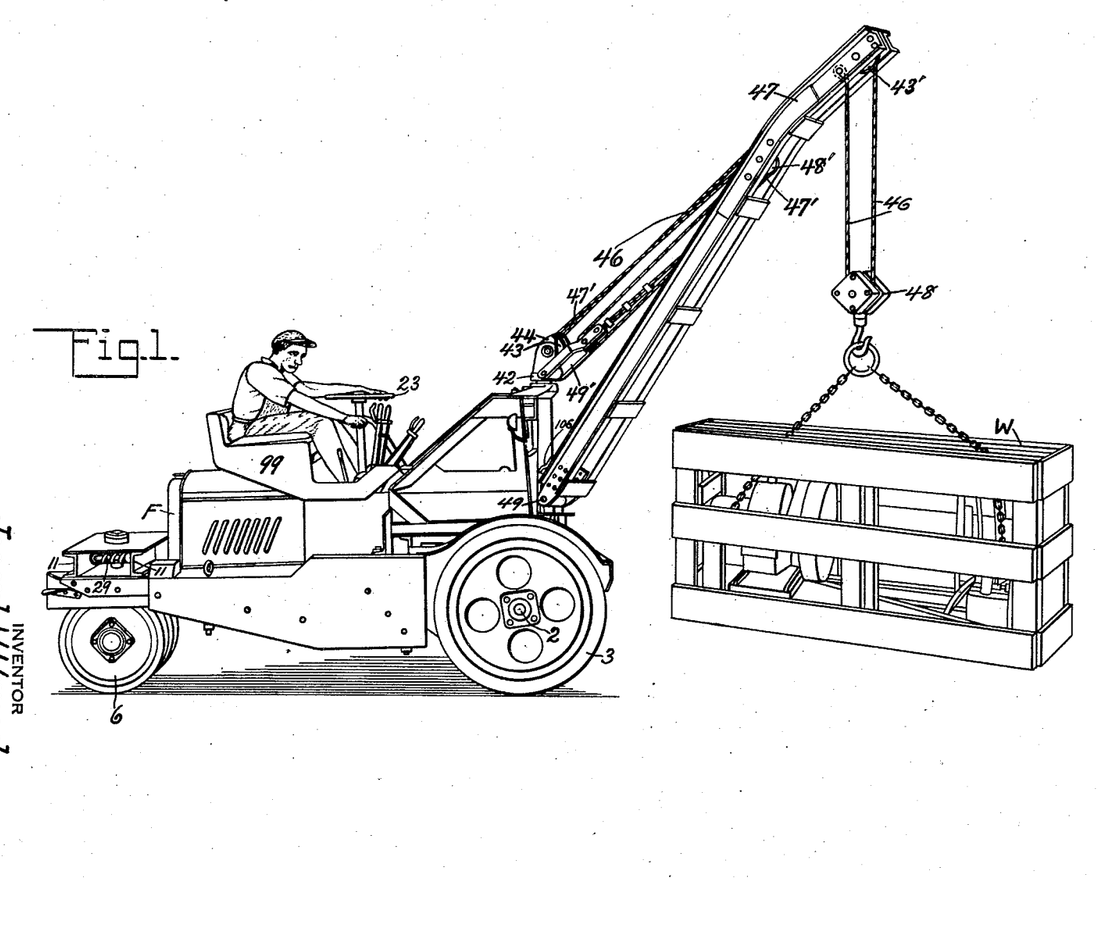
Figure 1 is a perspective view of the improved vehicle in operation.
Figure 2:
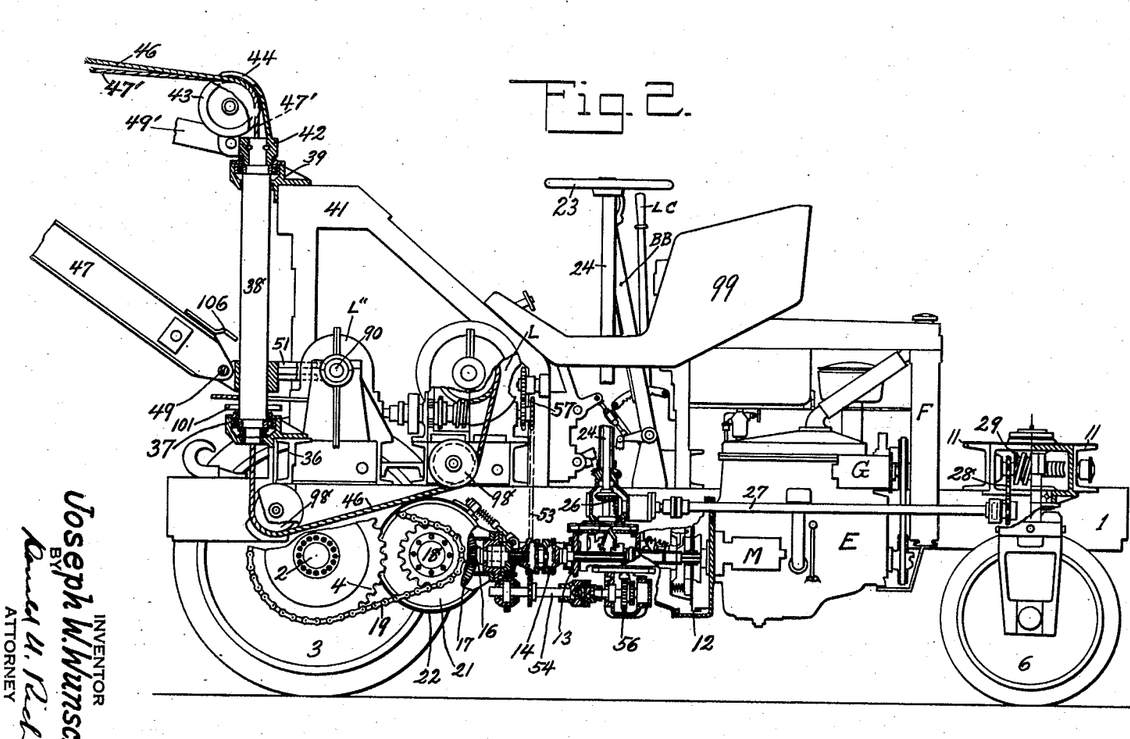
Fig. 2 is a side elevation, partly in section, of the vehicle with parts broken away to more clearly disclose the drive and steering mechanism.
Figures 7, 8, 9:
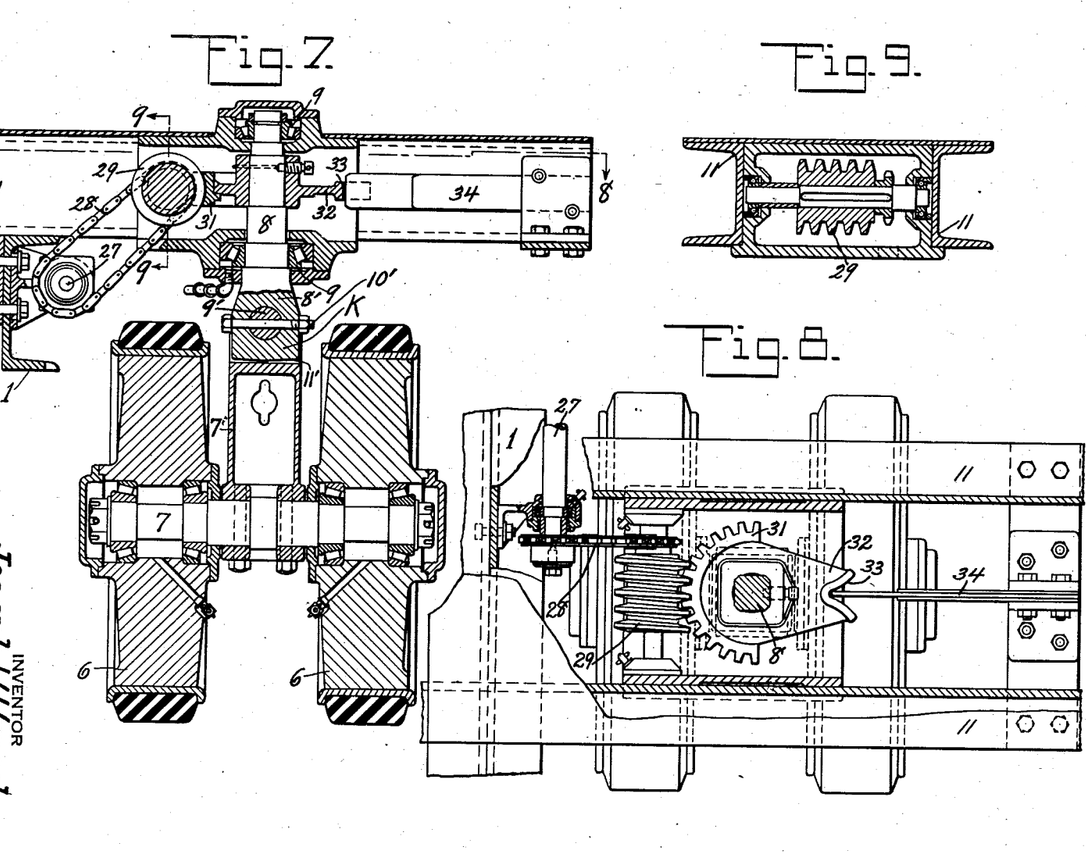
Fig. 7 is an enlarged sectional view showing the steering mechanism for the rear wheels of the vehicle.
Fig. 8 is a sectional view taken substantially on line 8—8 of Fig. 7.
Fig. 9 is a sectional view taken substantially on line 9—9 of Fig. 7.
Figure 10:
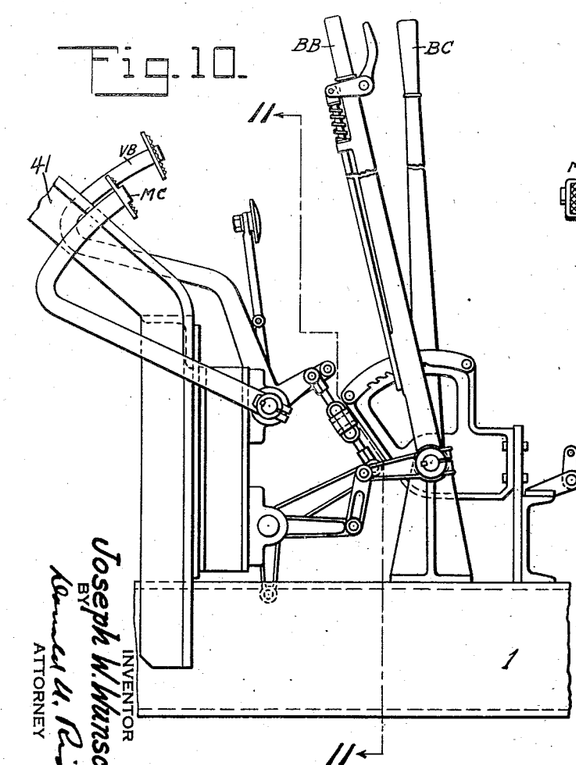
Fig. 10 is an elevational view disclosing the controls available to the operator.
Figure 11:
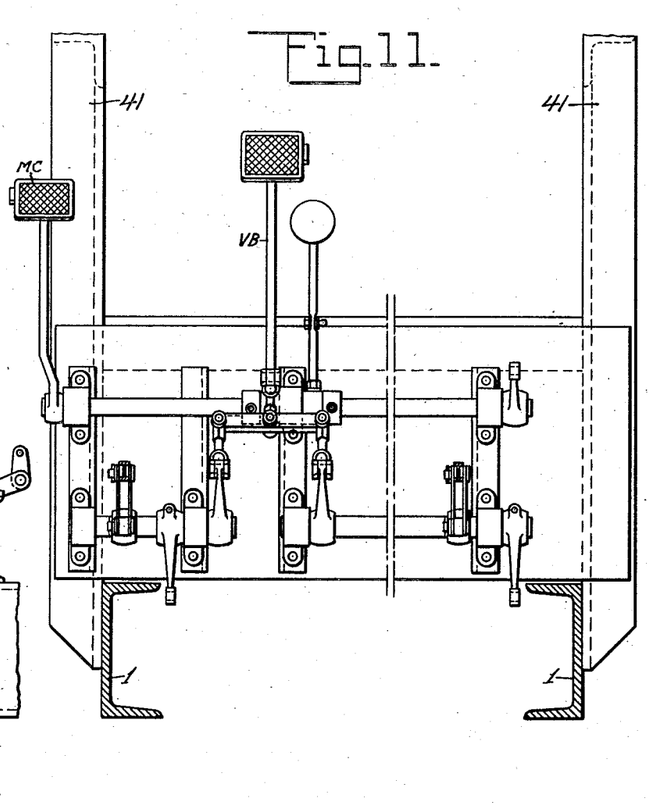
Fig. 11 is a sectional view taken substantially on line 11—11 of Fig. 10 and showing the foot control.

The king pin K has its upper end portion 8 formed as a trunnion in order to support the frame through spaced thrust bearings 9 attached to transverse members 11, channel shaped in cross section as clearly shown in Figs. 1, 2 and 7; these members 11 being connected in any suitable or desired manner to the longitudinal frame members 1.

The vehicle frame has mounted thereon in any suitable manner an engine E of any suitable type, preferably of the internal combustion type, provided with starting motor M, generator G, cooling system F and other necessary and customary auxiliary equipment. The crank shaft of this engine is connected through a more or less conventional main clutch 12 to speed change gearing 13 which, in turn, is connected through universal joint 14 to a bevel gear 16 meshing with a ring gear 17 differentially connected to shafts 18 from which chains 19 extend to individually drive the front wheels. The differential shafts 18 are provided with brake drums 21 adapted to be engaged by main vehicle brakes 22 operable by a foot lever VB mounted in a suitable position in front of the operator. The clutch 12 will also be operated by means of a clutch pedal MC, also mounted in a suitable position in front of the operator.

The vehicle is preferably steered manually by means of hand wheel 23 connected through vertical shaft 24 to bevel gearing 26 and shaft 27 extending longitudinally of the vehicle. This longitudinally extending shaft is shown as connected by means of chain 28 to a worm 29, journaled in a bearing member attached to the frame cross braces 11. The worm, in turn, meshes with a worm wheel sector 31 fastened to the vertical trunnion 8, previously referred to, thus permitting positive rotation of the trunnion by means of the hand wheel available to the operator. The worm sector is provided with an extension 32 formed with a V-shaped slot 33 adapted to engage a double acting cantilever spring 34 rigidly attached to the frame cross ties, and which spring will assist in returning the rear wheels to their straight forward position (see Figs. 7 and 8).

Figure 4:
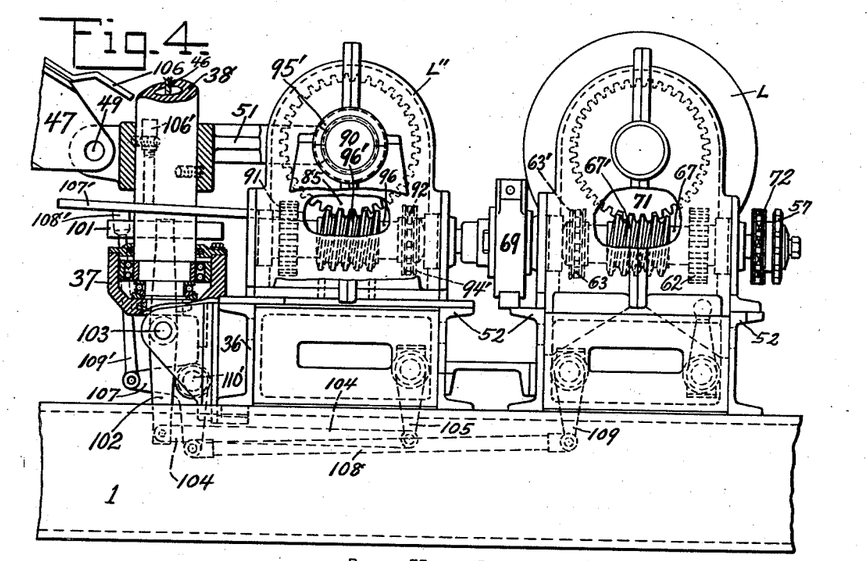
Fig. 4 is an elevational view of the mechanism shown in Fig. 3 with portions thereof broken away to more clearly disclose the pivot mounting of the hoist.
Figure 5:
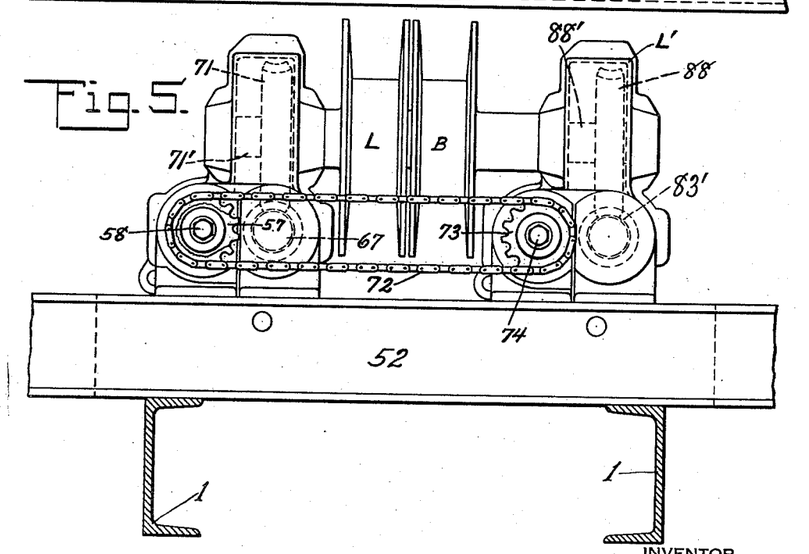
Fig. 5 is an end view of the power mechanism shown in Figs. 3 and 4.

The vehicle frame members adjacent their front ends are connected together by a suitable cross tie 36, adjacent the center of which is mounted a bracket casting 37 equipped with thrust bearings for reception of the lower end of pivot post or mast 38, the upper end of which has bearing in a casting 39 carried by a framework 41 attached to the front end of the vehicle frame and extending upwardly therefrom. The pivot post is provided on its upper end with a housing 42 carrying pulleys 43 and pulley frame 44, by means of which cable 46 may extend to and control the movements of the pulley block 48 adapted to raise the load W (Figs. 1, 2 and 4). The lower end of the boom is pivoted as at 49 to and supported by a projection formed on a worm sector 51 rigidly attached to the pivot post 38.

Figure 3:
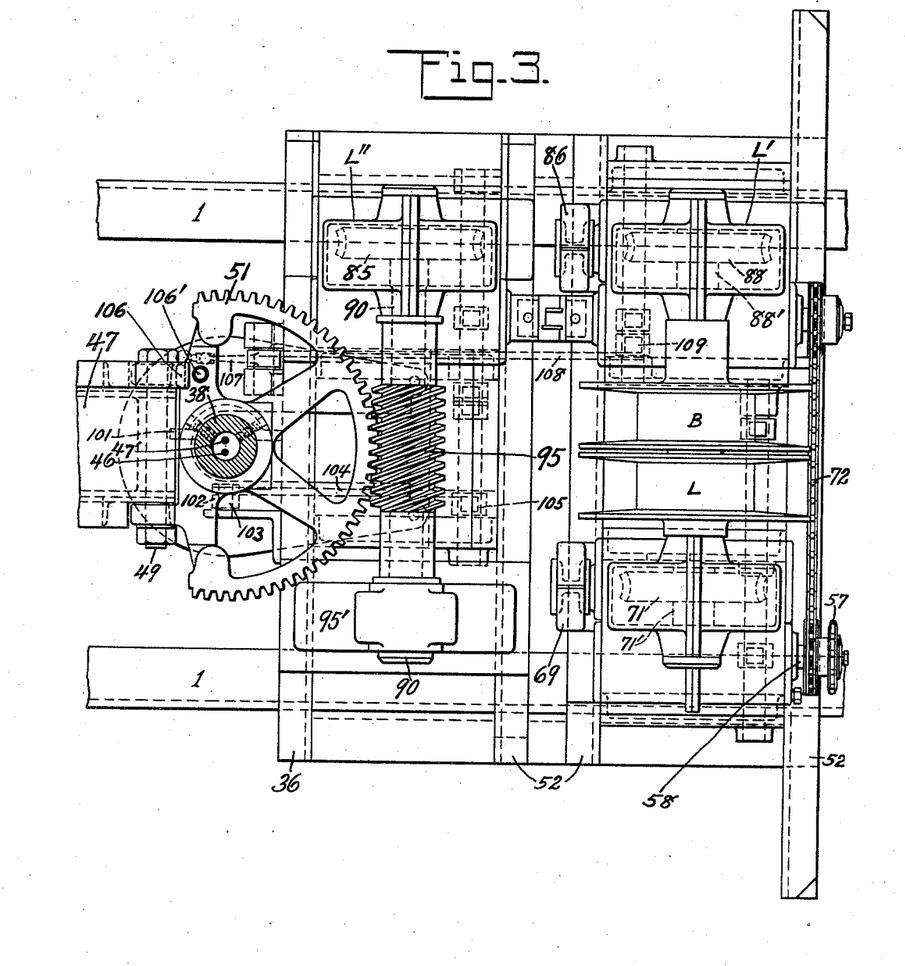
Fig. 3 is a plan view showing the improved gear and control mechanism for controlling the hoist movements.
Figure 6:
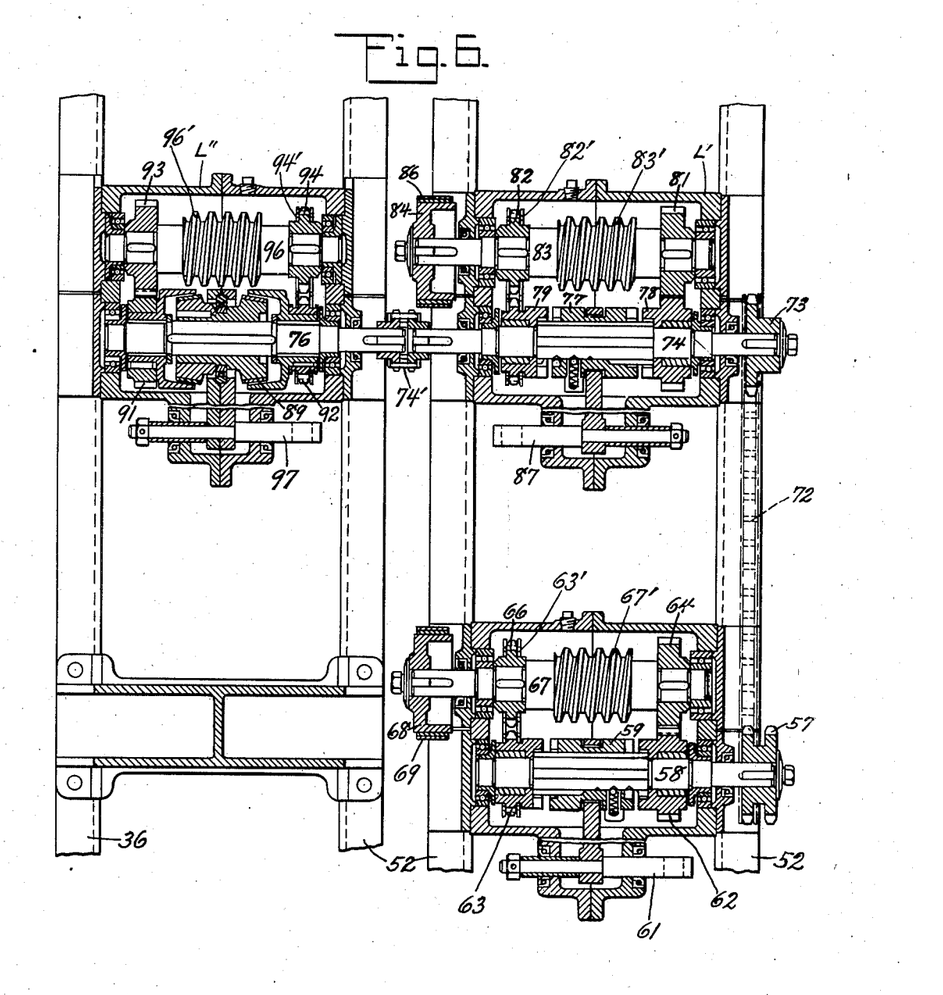
Fig. 6 is a sectional view showing the interior construction of the power mechanism disclosed in Figs. 3 to 5.
Figure 12:
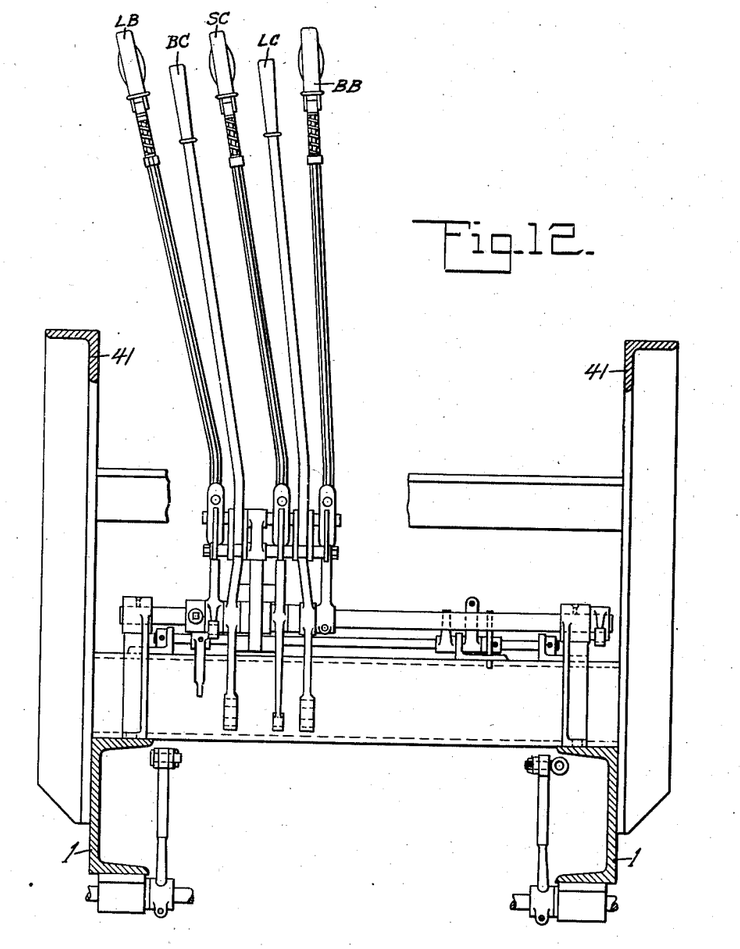
Fig. 12 is a sectional view taken substantially on line 11—11 of Fig. 10 but looking in the opposite direction to the hand control levers.

A plurality of intermediate ties 52, preferably of channel form, connect the vehicle side frames intermediate the front and rear ends thereof and form a support for gearing and hoist equipment adapted to receive power through chain or other means 53 from power take-off shaft 54 driven by gearing 56 from the main drive shaft. The chain or other drive means meshes with and drives sprocket 57 (Figs. 3 to 6 inclusive) keyed or otherwise rigidly attached to shaft 58. This shaft is rotatably mounted in the gear box and carries centrally thereof splines upon which are slidably mounted a toothed clutch 59 shiftable on shaft 58 by connections 61 connected in any suitable manner with lever LC (Fig. 12). Rotatably mounted on shaft 58 is a spur gear 62 and a sprocket 63 located respectively adjacent opposite end portions of clutch 59 and adapted to be respectively engaged with said clutch. Spur gear 62 is arranged in meshing relation with a gear 64 non-rotatably secured to shaft 67 journaled in the gear box while sprocket 63 is connected by chain 63' to a sprocket 66 secured to shaft 67—all as shown clearly in Fig. 6. Shaft 67 extends beyond the gear housing and drum 68 of an automatic brake having brake member 69; the automatic brake being of conventional design. Shaft 67 also carries a worm 67' arranged in meshing relation with worm wheel 71 fixed on a shaft 71' journaled in the gear box and carrying load hoist drum L. It is apparent that the clutch 59 may be shifted on shaft 58 by lever LC which operates connection 67 so that said clutch will engage either spur gear 62 or sprocket 63, as desired. The sprocket 57, previously referred to, is of double construction with one portion connected by means of a chain or other device 72 with a sprocket 73 keyed to a shaft 74 rotatably journaled in a gear box L' and extended therebeyond and connected by flexible coupling 74' with a shaft 76 rotatably mounted in a gear box L" carried by the transverse frame members 52. The shaft 74 is splined in its central portion to clutch 77 adapted to be engaged with spur gear 78 or sprocket 79 rotatably carried on the shaft. Spur gear 78 is arranged in meshing relation with gear 81 carried on a shaft 83 journaled in gear box L' while sprocket 79 is connected with a sprocket 82 by drive chain 82'. Like shaft 67, shaft 83 extends beyond gear box L' and is provided with a conventional automatic brake including elements 84 and 86. Clutch 77 is shiftable on shaft 74 by lever BB which is connected in any suitable manner with lever mechanism 87. Shaft 83 carries a worm 83' arranged in meshing relation with worm wheel 88 secured to a shaft 88' journaled in gear box L' and extended therebeyond to carry a boom hoist drum B. The shaft 76, previously referred to, is rotatably mounted in its gear box and provided at its central portion with splines along which a friction clutch coupling 89 may slide into engagement with mating clutch elements rigid with a spur gear 91 and sprocket 92 rotatably carried by the shaft and connected respectively with spur gear 93 and sprocket 94 non-rotatably carried by a shaft 96 journaled in the gear box L"; the sprocket 92 being connected with sprocket 94 by drive chain 94'. Formed on shaft 96 is a worm 96' arranged in meshing relation with worm gear 85 carried on shaft 90, which latter has one end portion journaled in gear box L" arranged adjacent gear box L' and adjacent one frame member 1, and said shaft is arranged substantially parallel to shafts 71' and 88' and has its opposite end portion supported and journaled in a bearing box 95' supported by transverse members 36 and 52 adjacent the opposite frame member 1 (see Fig. 3). Shaft 90 carries a worm 95 arranged in meshing relation with sector 51, as also shown in Fig. 3. The sliding friction clutch coupling is controlled through suitable connections 97 by hand lever SC (Fig. 12).

It will be obvious from the preceding description that power obtained from the power take-off will continuously rotate shafts 58, 76 and 74 respectively and that these shafts may be clutched through proper operation of levers LC, BB and SC connected respectively with clutch operators 61, 87 and 97 to cause forward or reverse operation of worm shafts 67, 83 and 96 respectively. Since there is no interconnection, it is obvious that each clutch may be operated wholly independently of the other and to any desired position irrespective of the position of any other clutch, or they may all be operated simultaneously if desired, thus giving an extremely flexible control of the hoist. Load hoist cable 46 is connected with load hoist drum L and extends under idler pulleys 98 (see Fig. 2) and over pulley 43 to the free end of boom 47 where it passes over pulley 43'. The free end of cable 46 is connected to the boom, as is usual.

The boom cable is indicated at 47' and has one end connected to drum B. Cable 47' extends under pulleys 98 and over pulley 43 and pulley 48' on the boom 47 and has its opposite end connected with bridle 49' pivoted to housing 42. In the instance shown, cables 46 and 47' extend through post 38 but this is merely by way of example as obviously they may be arranged outside the post 38 if desired. It will thus be seen that by proper operation of the clutches the load may be raised and lowered, the boom angle changed or the boom rotated independently.

As is clearly shown in Figs. 1, 2, 10, 11 and 12 the various control levers and foot pedals are conveniently mounted on cross members adjacent the operator's seat 99 and from which he may control all movements of the vehicle and attached hoist equipment. Since there are a large number of controls for the operator and since there is always a possibility that such controls may be operated in a manner detrimental to the machine, various safety devices now to be described have been provided to protect the machine.

In order to protect the mechanism controlling the swinging of the boom, stops 101 (Figs. 3 and 4) have been attached to the pivot post slightly off center and these stops are adapted to engage the upper end of a lever 102 pivoted as at 103 to the vehicle frame and extended therebelow for connection to a rod 104, which in turn is connected to a lever 105 operatively connected with the friction clutch controlling means 97. By placing the stops off center on the pivot post, the pivot post is permitted to rotate slightly more than 180 degrees, with its rotation in either direction checked when the stop strikes the lever and through the connections disengages the friction clutch 89. The release of the friction clutch by means of the safety stops and lever will not prevent the operator from engaging the clutch to cause rotation of the gearing in the opposite direction but will, of course, prevent his engaging the clutch in such a manner as to damage the gearing. Thus it will be seen that if the operator should neglect to disengage the clutch controlling swinging of the boom, the safety stops will automatically disengage the clutch and prevent injury to the gearing or, on the other hand, if the operator is desirous of swinging the boom to one of its limit positions, it is only necessary for him to engage the clutch, after which the equipment will take care of itself.

Since there is also a possibility of the operator damaging the boom, boom pivot and associated mechanism during such times as he may be changing the angular position of the boom, a safety device is provided to prevent such injury. There are various ways in which this safety device may be coupled but, in the instance shown a contactor 106 is attached to the boom adjacent its pivoted end portion (see Figs. 2 and 4) which is adapted to engage a stud 106' projecting through the boom swinger sector 51 and having its lower end bearing on a plate 107' suitably hinged to the vehicle frame and having a depending projection 108' connected through link 109' with one arm of a bell crank lever 107, suitably pivoted at 110' and having its other arm connected by connecting rod 108 to lever 109 arranged to disengage clutch 77.

The operation of the vehicle and associated equipment is as follows and assuming the engine to be running: Engagement of the main clutch MC, after proper operation of the drive gearing, will cause the engine to drive the front wheels through the differential shafts and sprocket connections, thus propelling the vehicle either forward or backward as desired. By turning the steering wheel the angular movements of the vehicle may be controlled through the connections to the rear steering wheels. In case a load connected to the pulley blocks 48 is to be shifted, the operator will shift lever LC causing connections 61 to shift the toothed clutch 59 into engagement with the proper element and causing the proper rotation of worm shaft 67 and load hoist drum L, thus either raising or lowering a load as desired. The load may be held in any desired position by the automatic brake as is usual.

In case the operator for some reason desires to shift the vertical angular position of the boom, relative to the vehicle, this may be accomplished by proper operation of the lever BB, thus causing the toothed clutch 77 to engage with the proper element, with the result that the worm shaft 83 will be rotated and in turn rotate the boom hoist drum B. If the operator for any reason should set the mechanism in operation to lift the boom and neglect to stop its operation, then the contactor 106 will, through stud 106', projection 108' and the bell crank and other connections cause the toothed coupling 77 to be released preventing damage to the gearing.

When the operator desires to swing the boom about the boom pivot or, in other words, to change the horizontal angular position of the boom relative to the vehicle, he may do so by a proper shifting of the lever SC causing through connection 97 proper movement of friction clutch 89, thus resulting in the desired rotation of worm shaft 96, sector 51 and pivot post 38. In case the operator should neglect to stop operation of the boom swinging mechanism by return of the lever SC to neutral position, then one of the stops 101 will engage lever 102 and through the connections will cause clutch 89 to be disengaged after the boom has swung to its extreme position at either side of the vehicle.

It will thus be seen that the operator has at his control an extremely flexible unit driven from a single power source, with each possible movement of the hoist and vehicle independently controllable and with certain of the functions protected by safety devices. With such a vehicle the operator may pick up and shift a load to any desired position with a minimum of effort and time. Attention is also particularly directed to the fact that the boom is mounted adjacent the driving wheels with the engine and operator remote therefrom, which will cause added weight to be applied to the driving wheels when a load is being carried. This adding of weight to the driving wheels will, of course, increase the traction thereof and will at the same time decrease the weight on the steering wheels, allowing the operator to more easily steer the vehicle when a load is being carried.

While the invention has been described more or less in detail, it is obvious that numerous modifications and rearrangements of parts will be apparent to persons skilled in the art from a study of the preceding description, together with the accompanying drawings and all such modifications and rearrangements of parts are contemplated as will fall within the scope of the following claims:

What is claimed is:

1. In a load handling vehicle, the combination of a frame, front and rear wheels supporting said frame, a prime mover mounted on said frame and connectable with said front wheels to propel the vehicle, a substantially vertically extending pivot post rotatably carried by said frame adjacent said front wheels, a boom and hoisting tackle operatively connected to said pivot post, means to rotate said pivot post and boom, reversing driving connections between said means and prime mover and including a clutch, manually operable means to move said clutch into an operative or inoperative position irrespective of the condition of the connection between the prime mover and the front drive wheels, and means automatically operable to move said clutch to an inoperative position limiting the rotation of said pivot post.

2. In a load handling vehicle, the combination of a frame, front and rear wheels supporting said frame, a prime mover mounted on said frame and connectable with said front wheels to propel the vehicle, a substantially vertically extending pivot post rotatably carried by said frame, a boom and hoisting tackle operatively connected to said pivot post, means to rotate said pivot post and boom, reversing driving connections between said means and prime mover and including a clutch, manually operable means to move said clutch into an operative or inoperative position irrespective of the condition of the connection between the prime mover and the front drive wheels, and means automatically operable to move said clutch to an inoperative position limiting the rotation of said pivot post, said last named means including stop lugs on said post engageable with a lever on said frame connected to said clutch.

3. In a load handling vehicle, the combination of a frame, front and rear wheels supporting said frame, a prime mover mounted on said frame and connectable with said front wheels to propel the vehicle, a substantially vertically extending pivot post rotatably carried by said frame, a boom pivotally connected to said pivot post at an angle thereto, means for modifying the angular relation between said boom and pivot post, driving connections including clutches between said means and prime mover, manually operable means for rendering said connections operative or inoperative, and means automatically operable to render said connections inoperative after a predetermined angular relation between said boom and pivot post has been reached.

4. In a load handling vehicle, the combination of a frame, driving wheels supporting the front end of said frame, steering wheels supporting the rear end of said frame, a prime mover carried by said frame adjacent said steering wheels and connectable at all times to said driving wheels, hoist means carried by said frame adjacent the front end thereof and substantially above the axis of the driving wheels, a plurality of independently controllable means for operating said hoist means irrespective of the condition of the driving connection between the front wheels and prime mover, and driving connections between said independently controllable means and said prime mover, said connections including reversing means whereby each of said plurality of independently controllable means may be independently reversed.

5. In a load handling vehicle, the combination of a frame, driving wheels supported at the front end of said frame, steering wheels at the rear end of said frame, power means arranged adjacent the steering wheels, transmission and clutch means operably connecting said power means and driving wheels, a rotatable post and swinging boom mounted above and adjacent said driving wheels, a power take-off from said power means, independent drive connections including clutches connected to said power take-off for operating said rotatable post and swinging boom, independent manually actuated means for actuating said clutches, and automatic means for actuating said clutches operated by the movement of said post and boom.

6. In a load handling vehicle, the combination of a frame, driving wheels supporting the front end of said frame, steering wheels supporting the rear end of said frame, a prime mover carried by said frame adjacent said steering wheels and having a driving connection with the driving wheels, hoist means including a mast and boom mounted adjacent the driving wheels, a bearing support for the lower end of said mast, a bearing support for the upper end of said mast, a super-structure extending upwardly from the vehicle frame for supporting said upper bearing, said super-structure including rearwardly extending spaced members, a power take-off from said prime mover, a plurality of driven elements for transmitting power from said take-off to said mast and boom, and means for independently controlling said driven elements.

7. In a load handling vehicle, the combination of an elongated frame, driving wheels supporting the front end of the frame, steering wheels at the rear end of the frame mounted for movement about a centrally positioned vertical axis, said axis being of sectional formation and the sections thereof being movable to permit movement of the steering wheels in vertical parallel planes, a prime mover carried by the frame and arranged adjacent said steering wheels, said prime mover having driving connection with said driving wheels, hoist means including a mast and boom mounted adjacent the driving wheels, a plurality of operating means connecting said mast and boom with said prime mover whereby said boom may be selectively elevated or swung on its mast, a super-structure for retaining the mast in its vertical position, said super-structure forming a partial housing for the operating means connecting said prime mover and mast and boom, and automatic means for disconnecting the operating means connecting the prime mover and the mast and boom upon movement of the latter to predetermined positions.

8. The substance of claim 7 characterized in that the operating connecting means between the prime mover and the mast and boom may be manually and independently actuated.

9. The substance of claim 7 characterized in that the operating means connecting the prime mover and mast and boom may be independently, manually and automatically actuated.

10. In a load handling vehicle, the combination of an elongated frame having driven front wheels and rear steering wheels, a prime mover supported by the frame adjacent the steering wheels and having a driving connection with the front driving wheels, control means including clutches between the prime mover and the mast and boom for selectively moving the latter to predetermined positions irrespective of the condition of the driving connection between the prime mover and driving wheels, manually movable means for selectively operating said clutches, a hand wheel for controlling the steering wheels, the control for said clutches and said steering means extending above the prime mover, and a control platform supported above the prime mover and being so constructed and arranged as to permit an operator to manipulate said control means and said hand wheel while having full vision of the load handling mechanism and of the space in front of the vehicle.

11. In a load handling vehicle, the combination of a frame, driving wheels supported at the front end of said frame, steering wheels at the rear end of said frame, power means arranged adjacent the steering wheels, drive connections operably connecting said power means and driving wheels, a rotatable post and swinging boom mounted above and adjacent said driving wheels, independent drive connections connecting said power means and rotatable post and swinging boom for operating the same, independent manually actuated means for controlling said independent drive connections, and automatic means for controlling said independent drive connections and operated by the movement of said post and boom.

JOSEPH W. WUNSCH.